United States Patent [19]
Harris et al.

[11] Patent Number: 5,900,040
[45] Date of Patent: May 4, 1999

[54] ROASTING OF TITANIFEROUS MATERIALS

[75] Inventors: Harold Robert Harris, Geraldton; Ian Edward Grey, South Melbourne, both of Australia

[73] Assignee: RGC Mineral Sands Limited, Australia

[21] Appl. No.: 08/619,529
[22] PCT Filed: Sep. 21, 1994
[86] PCT No.: PCT/AU94/00564
§ 371 Date: Sep. 10, 1996
§ 102(e) Date: Sep. 10, 1996
[87] PCT Pub. No.: WO95/08652
PCT Pub. Date: Mar. 30, 1995

[30] Foreign Application Priority Data

Sep. 22, 1993 [AU] Australia ............................. PM 1413

[51] Int. Cl.$^6$ .................................................. C22B 34/12
[52] U.S. Cl. ............................ 75/435; 75/477; 266/173; 423/86
[58] Field of Search ............................. 266/173; 423/86; 75/474, 477, 478, 479, 480, 481, 435

[56] References Cited

U.S. PATENT DOCUMENTS

| | | | |
|---|---|---|---|
| 2,814,558 | 11/1957 | Halversen . | |
| 3,705,795 | 12/1972 | Heitman | 75/478 |
| 3,988,148 | 10/1976 | Queneau et al. . | |
| 4,378,244 | 3/1983 | Kennelley et al. . | |
| 4,740,239 | 4/1988 | Tuovinen et al. | 75/474 |
| 5,578,109 | 11/1996 | Harris et al. | 75/414 |

FOREIGN PATENT DOCUMENTS

| | | |
|---|---|---|
| A4840985 | 4/1987 | Australia . |
| A2695388 | 6/1989 | Australia . |
| A3859593 | 11/1993 | Australia . |
| 1193415 | 11/1985 | Russian Federation ............... 266/173 |

*Primary Examiner*—Melvyn Andrews
*Attorney, Agent, or Firm*—Harness, Dickey & Pierce, P.L.C.

[57] ABSTRACT

A method and apparatus of introducing one or more reagents into a rotary and/or elongate kiln in which titaniferous material is being treated eg upgraded wherein the reagent(s) is introduced (I) at a plurality of locations along the length of the kiln and/or (II) at or adjacent to a discharge end of the kiln. The reagents may comprise one or more of chlorine-containing compounds, sulphur, sulphur-containing compounds, magnesium compounds, manganese compounds, fluxes and glass-forming reagents, including a borate salt or mineral. The reagent may be mixed with the discharge end coal or introduced separately.

18 Claims, 1 Drawing Sheet

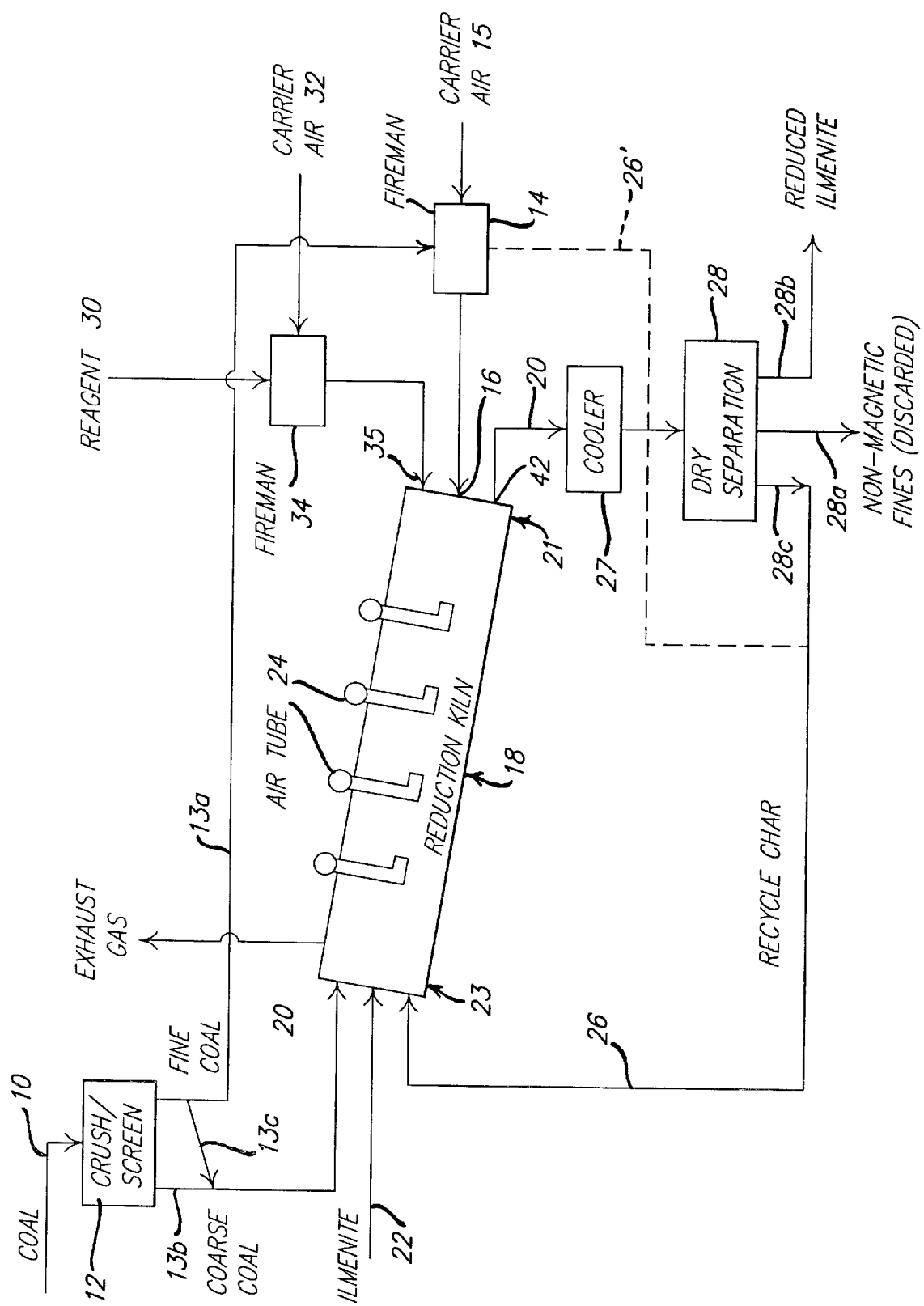

ROASTING OF TITANIFEROUS MATERIALS

FIELD OF THE INVENTION

This invention relates generally to the treatment of titaniferous materials, e.g. ores such as ilmenite, in a kiln such as a rotary kiln. Such processes include those in which at least part of the iron contained in the titaniferous ore is reduced to metallic iron or to the ferrous state. The metallic or ferrous iron, as the case may be, is typically removed to leave a titanium dioxide ($TiO_2$) residue known as synthetic rutile. More particularly, this invention relates to an improved method for the introduction of reagents to the kiln.

BACKGROUND ART

Ilmenite, altered ilmenites and rutile are the major, commercially-important mineral feedstocks for titanium metal and titanium dioxide pigment production. Most of the world's mined ilmenite is used for the production of titanium dioxide pigments for use in the paint and paper industries. Pigment grade $TiO_2$ has been traditionally produced by reacting ilmenite with concentrated sulphuric acid and subsequent processing to produce a $TiO_2$ pigment—the so-called sulphate route. However this process is becoming increasingly unacceptable on environmental grounds due to the large volumes of acidic liquid wastes which it produces. The alternative process—the so-called chloride route—involves reaction with chlorine to produce volatile titanium tetrachloride and subsequent oxidation to $TiO_2$. Unlike the sulphate route, the chloride route is capable of handling feedstocks, such as rutile, which are high in $TiO_2$ content and low in iron and other impurities.

Consequently the chloride-route presents fewer environmental problems and has become the preferred method for $TiO_2$ pigment production. Also, whilst the sulphate route is capable of producing only $TiO_2$ pigments, both titanium metal and $TiO_2$ pigments can be produced via the chloride route. Natural rutile supplies are insufficient to meet the world demands of the chloride-route process. Thus there is an increasing need to convert or upgrade the more-plentiful ilmenites and altered ilmenites (typically 45 go 62% $TiO_2$) to synthetic rutile (containing over 90% $TiO_2$).

Several processes are known for the production of synthetic rutile. The most commonly-practised process, usually referred to as the Becher process, involves the following main stages:

1. Reduction, in a rotary kiln, of the iron oxides contained in the ilmenite feed largely to metallic iron using coal as the heat source and the reductant, the resultant mixture of metallic iron and titanium phases being known as "reduced ilmenite".
2. Cooling of the solids discharging from the reduction kiln.
3. Dry physical separation of the reduced ilmenite and surplus char.
4. Aqueous oxidation (known as aeration) of the reduced ilmenite to convert the metallic iron to iron oxide particles discrete from the $TiO_2$-rich mineral particles.
5. Wet physical separation to remove the iron oxide from the $TiO_2$-rich mineral comprising the synthetic rutile product.
6. An optional acid leaching stage to remove a portion of the residual iron and manganese and magnesium.
7. Washing, dewatering and drying of the synthetic rutile product.

In one advantageous but by no means exclusive application, the present invention is applicable to the first of these stages.

A paper entitled "Synthetic Rutile Operations of RGC Mineral Sands Limited at Capel and Narngulu, WA" ("Australasian Mining and Metallurgy", 1993, pp 1301 to 1304, published by The Australasian Institute of Mining and Metallurgy) describes, inter alia, reduction kiln operation including the feature of feeding coal to both the feed and discharge ends of the kiln.

Several other processes have been proposed for upgrading ilmenite or other ferro-titaniferous ores, and a number of these include a reduction step performed in a kiln.

One general class entails reduction of the iron to the ferrous state, followed by a direct acid leach of the kiln product to remove the iron. The so-called Murso process, described for example in British patent 1225826, involves a pre-oxidation of iron in the feed to the ferric state followed by reduction in a kiln, preferably using a gaseous reductant such as hydrogen, to the ferrous state or to a mixture of the ferrous and metallic states. Another process, known as the "Hybrid" process and disclosed for example in international patent publication WO91/13150, involves control of the temperature in the reduction kiln at a lower value than in the commercial Becher process so as to favour formation of a metatitanate phase which is readily leached to remove impurities.

A number of modifications to the Becher process, involving the addition of various reagents to the reduction kiln, have been proposed and/or are practised. These include the following:

1. The addition of a chlorine-containing compound together with sulphur or a sulphur-containing compound, as disclosed in Australian patent No. 516,155, with the object of decreasing the amount of pseudobrookite formed and thereby increasing the amount of iron available for metallisation.
2. The common practice of adding sulphur or a sulphur-containing compound (i.e. no chlorine-containing additive), as described in the aforesaid paper, and with the same object as in (1) above.
3. The addition of a magnesium and/or manganese compound, as disclosed in U.S. Pat. No. 3,502,460, with the object of producing an acid-soluble synthetic rutile product.
4. The addition of a flux in the form of a glass-forming reagent, e.g. a borate salt or mineral such as calcium borate, as disclosed in International patent publication WO94/03647 (PCT/AU93/00381), with the object of assisting in the removal of radioactive elements.

The practice hitherto has been to introduce these various reagents at the feed end of the kiln, that is added in parallel with the ilmenite feed or premixed with the ilmenite feed. The problem with this hitherto method of addition is the poor incorporation of the reagent(s) into the mineral. The word "incorporation" means the valuable portion of the added reagent(s) found to be present in the product such as reduced mineral, e.g. reduced ilmenite, as discharged from the kiln, expressed on a weight for weight basis. For example, using ferrous sulphate as a sulphur-containing reagent, percentage sulphur incorporation is the kg per hour of sulphur equivalent present in the reduced mineral discharged from the kiln (after deducting sulphur contributed by the coal and feed mineral) divided by the kg per hour of sulphur equivalent of the reagent times 100. It will be appreciated that some reagents are incorporated more/less readily than others.

The poor incorporation observed to date is demonstrated where elemental sulphur or ferrous sulphate (a sulphur-containing material) is introduced at the feed end of a reduction kiln. In this case, sulphur incorporation is in the range of only 15 to 30% and, in our experience, most typically 23%. This is not only wasteful in terms of reagent consumption but also leads to other difficulties. For example, that portion of sulphur not incorporated reports as $H_2S$, $SO_3$ and $SO_2$ in the reduction kiln exhaust gas, incurring expensive gas cleaning costs. In other instances, that portion of reagent(s) not incorporated condenses and leads to build-up in exhaust gas extraction systems.

DISCLOSURE OF THE INVENTION

It is an objective of the present invention, at least in its application to processes such as the Becher process and other kiln treatments of titaniferous materials, to overcome or at least alleviate these problems.

In accordance with the invention, it has been found that incorporation can be substantially improved by introducing the reagent(s) at a plurality of points along the length of the kiln or at or adjacent to a discharge end of the kiln. Also, in accordance with the invention, it has been realised that difficulties associated with the non-incorporated portion of the reagent(s) can, at least, be alleviated.

The invention accordingly provides, in one aspect, a method of introducing one or more reagents into a rotary and/or elongate kiln in which titaniferous material is being treated, e.g. upgraded, wherein the reagent(s) is introduced (i) at a plurality of locations on the length of the kiln and/or (ii) at or adjacent to a discharge end of the kiln.

In a second aspect, the invention provides a method of introducing one or more reagents into a rotary and/or elongate kiln in which a titaniferous ore, e.g. ilmenite, is being upgraded by reducing at least part of iron contained in the ore largely to metallic iron or to the ferrous state, wherein the reagent(s) is introduced (i) at a plurality of locations along the length of the kiln and/or (ii) at or adjacent to a discharge end of the kiln.

The invention further provides, in a third aspect, a method of treating, e.g. upgrading, titaniferous material in a rotary and/or elongate kiln, wherein one or more reagents are introduced into the kiln (i) at a plurality of locations along the length of the kiln and/or (ii) at or adjacent to a discharge end of the kiln.

The term "reagent(s)" is herein intended to refer to all materials, solid or fluid, introduced into the kiln except titaniferous ores, combustion air and carbonaceous materials such as coal. The term embraces but is not limited to the reagents mentioned in the four examples mentioned above as modifications of the Becher process. The reagent may, for example, comprise one or more reagents selected from those reagents.

The invention still further provides a process for treating titaniferous material, eg an ore such as ilmenite, by reducing iron oxides in the titaniferous material largely to metallic iron in a kiln, thereby producing a reduced titaniferous material, comprising feeding the titaniferous material and a reductant to the kiln at one or more feed port means, and recovering a mixture which includes the reduced titaniferous material from the kiln at one or more discharge port means, wherein one or more reagents are introduced into the kiln (i) at a plurality of locations along the length of the kiln and/or (ii) at or adjacent to a discharge end of the kiln.

Also provided by the invention is apparatus for treating titaniferous materials, eg an ore such as ilmenite, by reducing iron oxides in the titaniferous material largely to metallic iron, thereby producing a reduced titaniferous material, comprising:

a kiln;

one or more feed port means for the kiln for feeding titaniferous material and a reductant to the kiln;

one or more discharge port means for recovering a mixture which includes reduced ilmenite from the kiln; and means to introduce one or more reagents in to the kiln (i) at a plurality of locations along the length of the kiln and/or (ii) at or adjacent to a discharge end of the kiln.

The reagents incorporated may, and in most cases will, undergo a reaction with components of the mineral. In certain cases, such as sulphur addition, it may be preferable, and more convenient, to add the reagent(s) at or adjacent to the discharge end of the kiln. In other cases, such as glass-forming reagents, it may be preferable to add the reagent(s) at chosen specific locations along the length of the kiln in order that the addition can be made at selected temperatures or when the ilmenite has been reduced to a particular extent or with a particular physical relationship with the mineral in the kiln.

BRIEF DESCRIPTION OF THE DRAWINGS

The attaching drawing is a diagram of a preferred embodiment of the method and apparatus of the invention.

PREFERRED EMBODIMENT

In the illustrated embodiment, comprising a modification of the aforementioned Becher process, suitably sized ilmenite is fed at 22 into the upper end of an elongate inclined rotary kiln 18. Incoming coal 10 as reductant is first split into two size fractions, typically plus 10 mm and minus 10 mm, by screening or by crushing and screening (12). Typically 20 to 40% of the total coal, comprising only the fine sized fraction 13a, is fed into the discharge end 21 of the reduction kiln by pneumatic means 14 known as a fireman and consequently is usually referred to as blown coal. The blown coal is injected (16) into the rotary kiln 18 at high velocity in a stream of carrier air 15. The remaining coal, typically 60 to 80% of the total and comprising the coarse-sized fraction 13b and surplus fine-sized coal 13c is fed to the feed end 23 of the kiln (20) together with the ilmenite (22).

A number of air tubes 24, typically 6 to 10 mounted at approximately equally-spaced distances along the kiln, each fitted with an externally-mounted air fan provide the combustion air. The temperature profile of the gases and the solids bed is controlled, inter alia by regulating the amount of air at each shell fan. The gases travel counter-current to the solids. Typically, in the known process, the solids bed temperature is in the range of 1130 to 1180° C. near the kiln discharge end and 950 to 1000° C. at the middle of the kiln. Gas temperatures are 150 to 200° C. higher than the corresponding bed temperatures. The kiln conditions are controlled so that the iron oxides in the ilmenite are reduced largely to metallic iron. In order to maintain reducing conditions in the critical zone near the discharge end of the kiln and also to avoid sintering of the solids, the coal feed rates are adjusted so that some incompletely burned coal, that is char, is present along with the reduced ilmenite discharged.

A mixture of reduced titaniferous material, including metallic iron and particulate char, is recovered at discharge end 21 via discharge port 42. The recovered mixture is cooled at 27, typically in a water sprayed rotating drum sealed to maintain a reducing atmosphere and so prevent re-oxidation of the metallic iron, and then processed in a dry separation stage 28. A non-magnetic fines fraction 28a is discarded and a reduced ilmenite fraction 28b is passed for processing to synthetic rutile, typically including an aqueous aeration treatment to separate the metallic iron as a discrete oxide and optionally one or more acid leach stages. For reasons of coal economy, separated surplus char 28c is typically returned (26) to the feed-end of the kiln along with the ilmenite (22) and the feed-end coal (20). Alternatively, all or a portion of this char may be recycled (26') to the discharge end 21' of the kiln by being blown at 16, entrained in air stream 15 with which it is mixed in fireman 14. In that case there may be no delivery 13a of coal to fireman 14 and/or the coal and char may be delivered by separate firemen.

A reagent 30 to enhance, augment or modify the process in the kiln may be added to the kiln at 25 at the discharge end 21 by means of a further fireman 34. The reagent is of suitable particle size and is entrained in carrier air 32 by which it is injected 35 at high velocity into the interior of the kiln. Examples of reagents 30 particularly beneficial to the Becher process are sulphur and a borate salt or mineral such as calcium borate, for the respective purposes previously mentioned.

The reagent(s) may be premixed with the discharge-end coal and/or discharge-end char in fireman 14 but preferably is introduced by separate and parallel means such as further fireman 34 in addition to the fireman 14 at which the coal is introduced. When introduced along the length of the kiln, the reagent(s) may be added through the shell air tubes but preferably through ports specifically designed and located for reagent addition.

As may be expected, we have found that with feed-end reagent addition, percent incorporation is, inter alia, a function of reagent particle size; incorporation decreasing with decreasing size. From our trials using discharge-end addition, it would seem that the mean particle size does not have the same critical effect and that a relatively wide particle size range is preferable to a narrow size range.

As evident from the above discussion, the discharge end fuel may be so-called "blown coal" as disclosed in Australian patent No. 423,616 or so-called "blown char" as disclosed in Australian patent application No. 38595/93. It will also be understood that this invention also extends to those reduction kiln processes where the carbonaceous fuel is added all at the feed end, including those processes whereby the iron values in the titaniferous ore are reduced largely to the ferrous state only.

A disadvantage of the method of reagent addition hitherto practised is the relatively short residence time for the reagent(s) to become incorporated into the mineral. Depending upon the particular reagent, it is partially lost as fine particulate solids, vapour or gas to the countercurrent flow of gases above the mineral bed. Introducing the reagent(s) in accordance with the invention, clearly increases the residence time of the reagent within the kiln. With certain reagents, the higher temperatures prevailing towards the discharge end of the kiln will also assist in improving incorporation.

EXAMPLES

The following examples of full-scale plant trials demonstrate the improvement in incorporation achieved by introducing reagents at the discharge end rather than the feed end of rotary reduction kilns used for upgrading titaniferous ores by the Becher process as earlier described. In each of the examples, reagent of the same mean particle size and size distribution was used for feed-end and discharge-end addition.

Example 1

This trial was conducted on a reduction kiln measuring 27.4 meters long, refractory lined to give an internal diameter of 2.0 meters. The reagent used was a calcium borate mineral.

During the trial the kiln was continuously fed at the following rages:

| | |
|---|---|
| ilmenite | 2.2 tonnes per hour |
| total (feed end + discharge end) coal | 1.3 tonnes per hour |
| reagent | 0.077 tonnes per hour |

In order to compare feed-end versus discharge-end reagent addition, the reagent was initially added at the discharge end and then changed to addition at the feed end. Table 1 shows the relevant ilmenite feed and reduced ilmenite analyses.

TABLE 1

| Reagent addition point | Feed end | Discharge end |
|---|---|---|
| Ilmenite % $TiO_2$ | 59.5 | 60.2 |
| Reduced ilmenite % $TiO_2$ | 65.8 | 63.6 |
| Reduced ilmenite % CaO | 0.37 | 0.95 |

In addition to the higher CaO level when employing discharge-end addition, it can be seen that the greater incorporation of reagent had a diluting effect on the % $TiO_2$ in the reduced ilmenite.

The calcium borate reagent and the ilmenite feed respectively assayed 26.5% and 0.01% CaO. Based on these figures and Table 1, the percent incorporation can be calculated, viz.

| | |
|---|---|
| Feed-end addition | 35% |
| Discharge-end addition | 96% |

Example 2

This trial was conducted on a reduction kiln measuring 62 meters long, refractory lined to give an internal diameter of 4.6 meters. The reagent used was fine-sized elemental sulphur.

This kiln which hitherto had operated on feed-end sulphur addition was changed to discharge-end sulphur addition for a 48 hour trial period. In anticipation of a significant improvement in incorporation and due to temporary difficulties associated with handling discharge-end sulphur for trial purposes, discharge-end sulphur was fed at a lower rate compared to feed-end addition.

Table 2 sets out the relevant feed rates and analyses.

TABLE 2

| Reagent addition point | | Feed end | Discharge end |
|---|---|---|---|
| Ilmenite | tonnes per hour | 23.5 | 23.0 |
| Coal (all feed end) | tonnes per hour | 7.48 | 8.1 |
| Discharge-end char | tonnes per hour | 1.4 | 1.4 |
| Reagent (sulphur) | tonnes per hour | 0.525 | 0.120 |
| Ilmenite | % $TiO_2$ | 60.9 | 60.2 |
| Reduced ilmenite | % $TiO_2$ | 67.7 | 67.4 |
| Reduced ilmenite | % S | 0.55 | 0.48 |

After allowing for (ie deducting) sulphur incorporated from the sulphur present in the coal (determined by operating the kiln with no sulphur reagent addition), the percent sulphur incorporation was calculated, viz:

| Feed-end addition | 18% |
|---|---|
| Discharge-end addition | 65% |

We claim:

1. In a process for treating titaniferous material comprising feeding the titaniferous material to a rotary and/or elongated kiln at one or more feed ports means positioned at or adjacent a feed end of the kiln, providing conditions in the kiln to upgrade the titaniferous material to produce an upgraded titaniferous product, and recovering a mixture which includes the upgraded titaniferous product from the kiln at discharge port means at or adjacent a discharge end of the kiln, wherein one or more reagents are introduced into the kiln (i) at a plurality of locations along the length of the kiln, and/or (ii) at or adjacent to said discharge end of the kiln, said reagents including all solid and fluid materials introduced into the kiln except titaniferous ores, combustion air and carbonaceous materials.

2. A method according to claim 1 wherein the reagent(s) comprise one or more reagents selected from the group consisting of chlorine-containing compounds, sulphur, sulphur-containing compounds, magnesium compounds, manganese compounds, fluxes and glass-forming reagents.

3. A method according to claim 1 wherein the reagent(s) include sulphur or a sulphur-containing compound.

4. A method according to claim 1 wherein the reagent(s) include a borate salt or mineral.

5. A process according to claim 1 wherein said reductant is coal and/or char, and said reagent(s) is premixed with, and delivered to the kiln with at least a portion of said coal and/or char which is thereby also introduced at said locations and/or at or adjacent said discharge end of the kiln.

6. A method according to claim 1 wherein said reagent is introduced separately from coal being introduced at the discharge end.

7. In a process for treating titaniferous material, comprising feeding the titaniferous material and a reductant to an elongated kiln at one or more feed port means, positioned at or adjacent a feed end of the kiln, providing conditions in the kiln whereby iron oxides in the titaniferous material are reduced largely to metallic iron or a ferrous state in the kiln, thereby producing a reduced titaniferous material, and recovering a mixture which includes the reduced titaniferous material from the kiln at discharge port means at or adjacent a discharge end of the kiln, wherein one or more reagents are, for enhanced incorporation of said reagent(s), introduced into the kiln (i) at a plurality of locations along the length of the kiln, and/or (ii) at or adjacent to said discharge end of the kiln, said reagents including all solid and fluid materials introduced into the kiln except titaniferous ores, combustion air and carbonaceous materials.

8. A process according to claim 7 wherein said reductant is coal and/or char, and said reagent(s) is premixed with, and delivered to the kiln with at least a portion of said coal and/or char which is thereby also introduced at said locations and/or at or adjacent said discharge end of the kiln.

9. A method according to claim 7 wherein said reagent is introduced separately from coal and/or char being introduced at the discharge end.

10. A process according to claim 7, wherein said kiln is a rotary kiln.

11. A process according to claim 10, wherein said kiln is inclined to facilitate flow of the contents of the kiln from the feed end towards the discharge end.

12. A process according to claim 7, wherein said recovered mixture further includes particulate char, and at least a portion of said particulate char is recycled to the kiln in the region to said discharge port means by blowing the char entrained in a fluid stream.

13. A method according to claim 7 wherein the reagent(s) include sulphur or a sulphur-containing compound.

14. A method according to claim 7 wherein the reagent(s) include a borate salt or mineral.

15. A process according to claim 7, wherein said titaniferous material is titaniferous ore.

16. A process according to claim 15, wherein said titaniferous material is ilmenite.

17. In a process for treating titaniferous material comprising feeding the titaniferous material to a rotary and/or elongated kiln at one or more feed ports means positioned at or adjacent a feed end of the kiln, providing conditions in the kiln to upgrade the titaniferous material to produce an upgraded titaniferous product, and recovering a mixture which includes the upgraded titaniferous product from the kiln at discharge port means at or adjacent a discharge end of the kiln, wherein one or more reagents are introduced into the kiln at a plurality of locations along the length of the kiln, said reagents including all solid and fluid materials introduced into the kiln except titaniferous ores, combustion air and carbonaceous materials.

18. In a process for treating titaniferous material comprising feeding the titaniferous material to a rotary and/or elongated kiln at one or more feed ports means positioned at or adjacent a feed end of the kiln, providing conditions in the kiln to upgrade the titaniferous material to produce an upgraded titaniferous product, and recovering a mixture which includes the upgraded titaniferous product from the kiln at discharge port means at or adjacent a discharge end of the kiln, wherein one or more reagents are introduced into the kiln at or adjacent to said discharge end of the kiln, said reagents including all solid and fluid materials introduced into the kiln except titaniferous ores, combustion air and carbonaceous materials.

* * * * *